(12) United States Patent
Matsunami

(10) Patent No.: US 11,415,473 B2
(45) Date of Patent: Aug. 16, 2022

(54) PRESSURE SENSOR HAVING A FAILURE DETECTION UNIT

(71) Applicant: FUJI ELECTRIC CO., LTD., Kanagawa (JP)

(72) Inventor: Kazuhiro Matsunami, Matsumoto (JP)

(73) Assignee: FUJI ELECTRIC CO., LTD., Kanagawa (JP)

(*) Notice: Subject to any disclaimer, the term of this patent is extended or adjusted under 35 U.S.C. 154(b) by 123 days.

(21) Appl. No.: 17/033,914

(22) Filed: Sep. 27, 2020

(65) Prior Publication Data

US 2021/0010885 A1 Jan. 14, 2021

Related U.S. Application Data

(63) Continuation of application No. PCT/JP2019/034142, filed on Aug. 30, 2019.

(30) Foreign Application Priority Data

Oct. 26, 2018 (JP) .............................. JP2018-201634

(51) Int. Cl.
  *G01L 9/00* (2006.01)
  *G01L 9/06* (2006.01)

(52) U.S. Cl.
  CPC .......... *G01L 9/0054* (2013.01); *G01L 9/0073* (2013.01); *G01L 9/06* (2013.01)

(58) Field of Classification Search
  None
  See application file for complete search history.

(56) References Cited

U.S. PATENT DOCUMENTS 6,422,088 B1* 7/2002 Oba ....................... G01R 17/10
                                                      73/754
6,973,836 B2* 12/2005 Katsumata .............. G01L 9/065
                                                      73/715

(Continued)

FOREIGN PATENT DOCUMENTS

CN       105518426 A      4/2016
CN       108426659 A      8/2018

(Continued)

OTHER PUBLICATIONS

Notice of First Office Action for Patent Application No. 201980021523. 5, issued by The National Intellectual Property Administration of the People's Republic of China dated Jul. 27, 2021.

(Continued)

*Primary Examiner* — Peter J Macchiarolo
*Assistant Examiner* — Jermaine L Jenkins

(57) ABSTRACT

If the bridge circuit fails due to damage of the diaphragm, the damage is detected at an early stage. A pressure sensor comprises: a substrate provided with a diaphragm; a bridge circuit having four resistor devices provided at the diaphragm, the bridge circuit being applied with high-voltage-side voltage and low-voltage-side voltage, and having two output terminals; a detecting unit for detecting a first output at a first output terminal and a second output at a second output terminal, each output terminal being of the bridge circuit; and a failure detecting unit for detecting failure of the bridge circuit based on a detection result at the detecting unit.

10 Claims, 11 Drawing Sheets

(56) References Cited

U.S. PATENT DOCUMENTS

| | | | |
|---|---|---|---|
| 7,271,595 B2 | 9/2007 | Shimizu | |
| 8,201,455 B2* | 6/2012 | Enomoto | G01L 9/0047 |
| | | | 73/736 |
| 2002/0100948 A1* | 8/2002 | Yoshihara | G01L 9/06 |
| | | | 257/415 |
| 2004/0166601 A1* | 8/2004 | Yoshihara | G01L 27/005 |
| | | | 438/50 |
| 2006/0250146 A1* | 11/2006 | Braun | G01L 1/2281 |
| | | | 324/720 |
| 2007/0115005 A1 | 5/2007 | Shimizu | |
| 2011/0005323 A1 | 1/2011 | Enomoto | |
| 2016/0146687 A1 | 5/2016 | Longu | |
| 2016/0209287 A1 | 7/2016 | Hirayama | |
| 2018/0136066 A1* | 5/2018 | Wagner | G01L 13/025 |

FOREIGN PATENT DOCUMENTS

| | | |
|---|---|---|
| JP | H04109371 U | 9/1992 |
| JP | H10339673 A | 12/1998 |
| JP | 2001183254 A | 7/2001 |
| JP | 2001201413 A | 7/2001 |
| JP | 2005037318 A | 2/2005 |
| JP | 2007139667 A | 6/2007 |
| JP | 2009264890 A | 11/2009 |
| JP | 2015092149 A | 5/2015 |
| TW | 200720658 A | 6/2007 |

OTHER PUBLICATIONS (ISA/237) Written Opinion of the International Search Authority for International Patent Application No. PCT/JP2019/034142, issued/mailed by the Japan Patent Office dated Sep. 24, 2019.

* cited by examiner

| CASE | LINE BREAK | FIRST OUTPUT TERMINAL | SECOND OUTPUT TERMINAL | DETERMINATION |
|---|---|---|---|---|
| 1 | NONE | 2V | 2V | O (NORMAL) |
| 2 | (1) | 2V | 0V | X (ABNORMAL) |
| 3 | (2) | 0V | 2V | × |
| 4 | (3) | 2V | 4V | × |
| 5 | (4) | 4V | 2V | × |
| 6 | (1) AND (2) | 0V | 0V | × |
| 7 | (1) AND (3) | 2V | Open | RESULT OF THE VOLTAGE VARIATION PROCESSING: IF THE VOLTAGE VARIATION OF THE SECOND OUTPUT TERMINAL IS WITHIN THE PREDETERMINED RANGE, THEN: X |
| 8 | (1) AND (4) | 4V | 0V | × |
| 9 | (2) AND (3) | 0V | 4V | × |
| 10 | (2) AND (4) | Open | 2V | RESULT OF THE VOLTAGE VARIATION PROCESSING: IF THE VOLTAGE VARIATION OF THE FIRST OUTPUT TERMINAL IS WITHIN THE PREDETERMINED RANGE, THEN: X |
| 11 | (3) AND (4) | 4V | 4V | × |
| 12 | (1), (2) AND (3) | 0V | Open | × |
| 13 | (1), (2) AND (4) | Open | 0V | × |
| 14 | (1), (3) AND (4) | 4V | Open | × |
| 15 | (2), (3) AND (4) | Open | 4V | × |
| 16 | (1), (2), (3) AND (4) | Open | Open | RESULT OF THE VOLTAGE VARIATION PROCESSING: IF THE VOLTAGE FLUCTUATIONS OF THE FIRST AND THE SECOND OUTPUT TERMINALS ARE WITHIN THE PREDETERMINED RANGE, THEN: X |

*FIG. 11*

PRESSURE SENSOR HAVING A FAILURE DETECTION UNIT

The contents of the following Japanese patent applications are incorporated herein by reference:
No. 2018-201634 filed on Oct. 26, 2018, and
No. PCT/JP2019/034142 filed on Aug. 30, 2019.

BACKGROUND

1. Technical Field

This invention relates to a pressure sensor.

2. Related Art

A pressure sensor having a diaphragm formed in a semiconductor substrate is widely used. In the diaphragm, a bridge circuit, to which high-voltage-side voltage and low-voltage-side voltage are applied, is disposed. The bridge circuit has two output terminals, and the variation in the resistance that forms the bridge circuit is detected based on the voltage difference between these two output terminals. It is known that there is a possibility that the diaphragm may be damaged when excess pressure is applied to the diaphragm (for example, Patent Document 1).

Patent Document 1: Japanese Patent Application Publication No. 2009-264890

Problems to be Solved

For a pressure sensor, when a diaphragm is damaged, it is preferable that the damage is detected at an early stage.

GENERAL DISCLOSURES

In the first example of the present invention, a pressure sensor is provided. The pressure sensor may comprise a substrate. The substrate may be provided with a diaphragm. The pressure sensor may comprise a bridge circuit. The bridge circuit may include four resistor devices. The four resistor devices may be provided at the diaphragm. To the bridge circuit, a high-voltage-side voltage and a low-voltage-side voltage may be applied. The pressure sensor may comprise a detecting unit. The detecting unit may detect, a first output at a first output terminal of the bridge circuit, and a second output at a second output terminal, respectively. The pressure sensor may comprise a failure detecting unit. The failure detecting unit may detect failure of the bridge circuit, based on the detection result at the detecting unit.

The failure detecting unit may determine that the bridge circuit is in failure, when at least one of the first output and the second output is out of the predetermined range which includes an intermediate voltage of the high-voltage-side voltage and the low-voltage-side voltage.

The pressure sensor may further comprise a voltage control unit. The voltage control unit may vary at least one of the high-voltage-side voltage and the low-voltage-side voltage in order that the intermediate voltage between the high-voltage-side voltage and the low-voltage-side voltage is varied. The failure detecting unit may detect failure of the bridge circuit, based on the variation of at least one of the first output and the second output when the intermediate voltage is varied.

The detecting unit may include an AD converter. The AD converter may AD-convert the first output and the second output in a time-sharing manner.

The AD converter may AD-convert the first output, the second output, and the difference between the first output and the second output in a time-sharing manner. The pressure sensor may further comprise a pressure calculating unit. The pressure calculating unit may calculate pressure based on the digital value of the difference between the first output and the second output.

The pressure sensor may further comprise a temperature detecting unit. The temperature detecting unit may output temperature signal depending on the detected temperature. The AD converter may AD-convert the first output, the second output, the difference between the first output and the second output, and the temperature signal in a time-sharing manner.

The pressure sensor may comprise a buffer. The buffer may input signals inputted to the AD converter. The pressure sensor may comprise a selecting unit. The selecting unit may select in a time-sharing manner and input to the buffer the first output, the second output, and the temperature signal.

The high-voltage-side voltage of the bridge circuit may be inputted as a high-voltage-side supply voltage to the AD converter.

The summary clause does not necessarily describe all necessary features of the embodiments of the present invention.

The present invention may also be a sub-combination of the features described above.

BRIEF DESCRIPTION OF THE DRAWINGS

FIG. 11 shows an example of failure detection by the pressure sensor 100 of the embodiment of the present invention.

DESCRIPTION OF EXEMPLARY EMBODIMENTS

Hereafter is described the present invention through the embodiment of the invention, however, the embodiment described below does not limit the invention according to the claims. Moreover, not all the combinations of the features explained in the embodiment are necessarily essential for the means to solve the problems.

Figure 1:
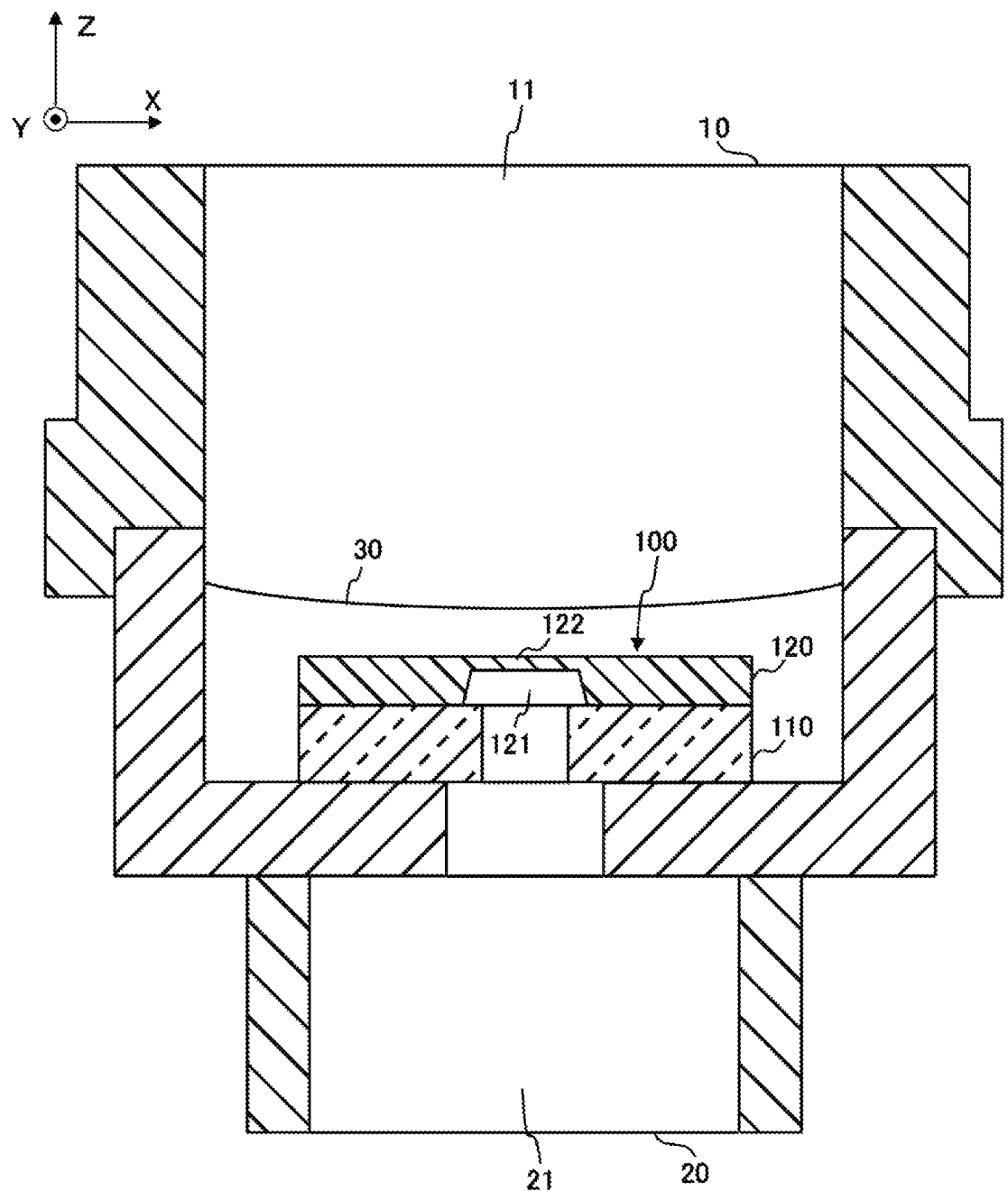
FIG. 1 shows an example, where a pressure sensor 100 of an embodiment of the present invention is applied for detecting pressure of a pressure medium.

FIG. 1 shows an example, wherein the pressure sensor 100 of the embodiment of the present invention is applied for detecting pressure of a pressure medium. The pressure sensor 100 shown in FIG. 1 is a relative pressure sensor. The pressure sensor 100 measures differential pressure between the pressure of a first pressure medium 11 inside a first chamber 10 and the pressure of a second pressure medium 21 inside a second chamber 20. The first pressure medium 11 and the second pressure medium 21 may be a gas or a liquid. The pressure sensor 100 is, in an example, used for automotive engine control or for pressure control inside a fuel tank. However, the present invention can be applied not only to a relative pressure sensor, but also to an absolute pressure sensor that has the second chamber 20 being a vacuum reference chamber sealed with a silicon or the like.

The pressure sensor 100 comprises a base material 110 such as a glass, and a semiconductor substrate 120. The semiconductor substrate 120 is, for example, a silicon semiconductor substrate. The semiconductor substrate 120 is formed with a concave portion 121 at its back-surface side. The bottom-surface of the concave portion 121 forms a thin plate-shaped diaphragm 122 having a thickness of about 10 μm to 50 μm.

The diaphragm 122 has a thin semiconductor thin plate-shape, with its circumference retained by the thick semiconductor substrate. Accordingly, it is easily deformed if subjected to a pressure by the first pressure medium 11 and the second pressure medium 21. Pressure can be detected by the output variation of the bridge circuit configured of gauge resistors provided on the diaphragm 122. The bridge circuit will be described later.

The first pressure medium 11 and the second pressure medium 21 are spaced apart by means of the diaphragm 122. The top-surface of the diaphragm 122 is the pressure-receiving surface. To protect the diaphragm 122, the top-surface of the diaphragm 122 may be covered by a protection material 30 such as a gel. In this example, the protection material 30 is provided only at the first chamber 10 side, however, unlike this example, a protection material may be provided also on the back-surface side of the diaphragm 122 of the second chamber 20.

It is difficult to completely prevent a case where excess pressure is applied to the diaphragm 122 due to freeze damage, surge pressure or the like. If the diaphragm 122 is damaged, the first pressure medium 11 and the second pressure medium 21 cannot be spaced apart. If the pressure of the second pressure medium 21 is higher than the pressure of the first pressure medium 11, the second pressure medium 21 may leak out to the first pressure medium 11 side. Therefore, if the diaphragm 122 is damaged, the pressure sensor 100 quickly detects the damage of the diaphragm 122 to give alert to an external control unit or the like. The external control unit will stop the system, as is necessary, or will inform to a user that repairing is necessary.

Figure 2:
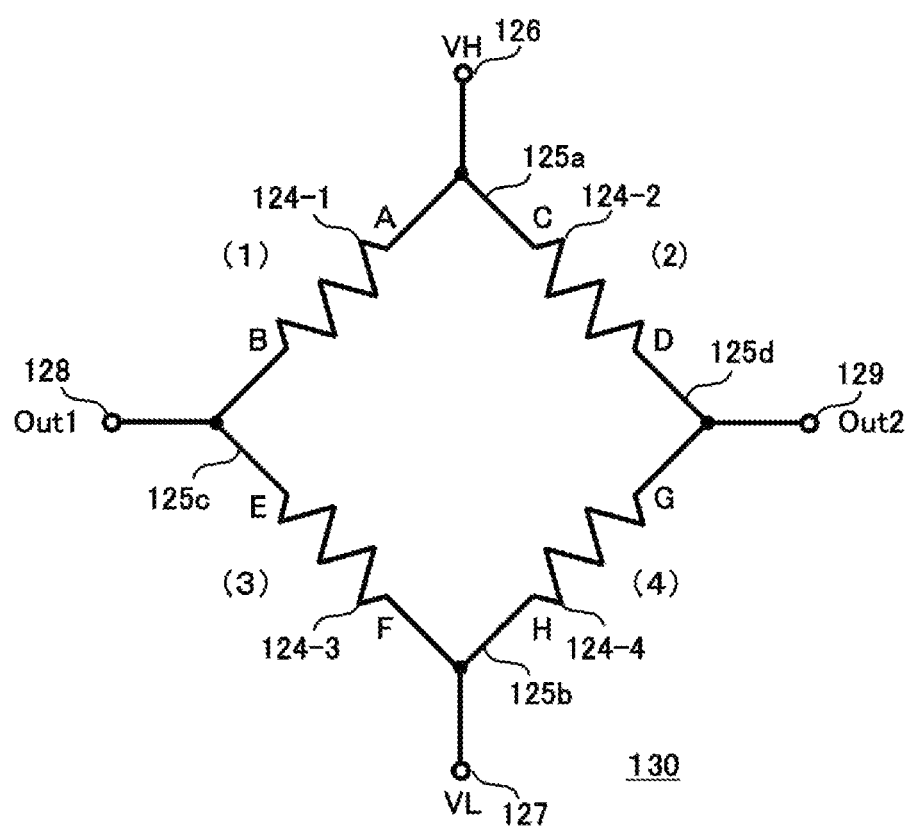
FIG. 2 shows an example of a bridge circuit of the pressure sensor 100.

FIG. 2 shows an example of a bridge circuit 130 of the pressure sensor 100. The pressure sensor 100 comprises the bridge circuit 130 shown in FIG. 2. The bridge circuit 130 includes four resistor devices 124-1, 124-2, 124-3, 124-4 provided at the diaphragm 122. The bridge circuit 130 may constitute a Wheatstone bridge. The four resistor devices 124-1, 124-2, 124-3, 124-4 are called "gauge resistors" or "piezo resistors". Neighboring resistor devices 124 are connected by bridging sections 125a, 125b, 125c, 125d provided at the semiconductor substrate 120.

As shown in FIG. 2, a high-potential-side end section A of the resistor device 124-1 is electrically connected to a high-potential-side end section C of the resistor device 124-2 by means of the bridging section 125a. The bridging section 125a is electrically connected to the high-voltage-side terminal 126 to which a high-voltage-side voltage VH is applied. On the other hand, a low-potential-side end section F of the resistor device 124-3 is electrically connected to a low-potential-side end section H of the resistor device 124-4 by means of the bridging section 125b. The bridging section 125b is electrically connected to a low-voltage-side terminal 127 to which a low-voltage-side voltage VL is applied.

The resistor device 124-1 and the resistor device 124-3 are electrically connected in series by means of the bridging section 125c. The bridging section 125c is electrically connected to a first intermediate potential terminal 128 which works as a first output terminal Out 1. The resistor device 124-2 and the resistor device 124-4 are electrically connected in series by means of the bridging section 125d. The bridging section 125d is electrically connected to a second intermediate potential terminal 129 which works as a second output terminal Out 2.

Figure 3:
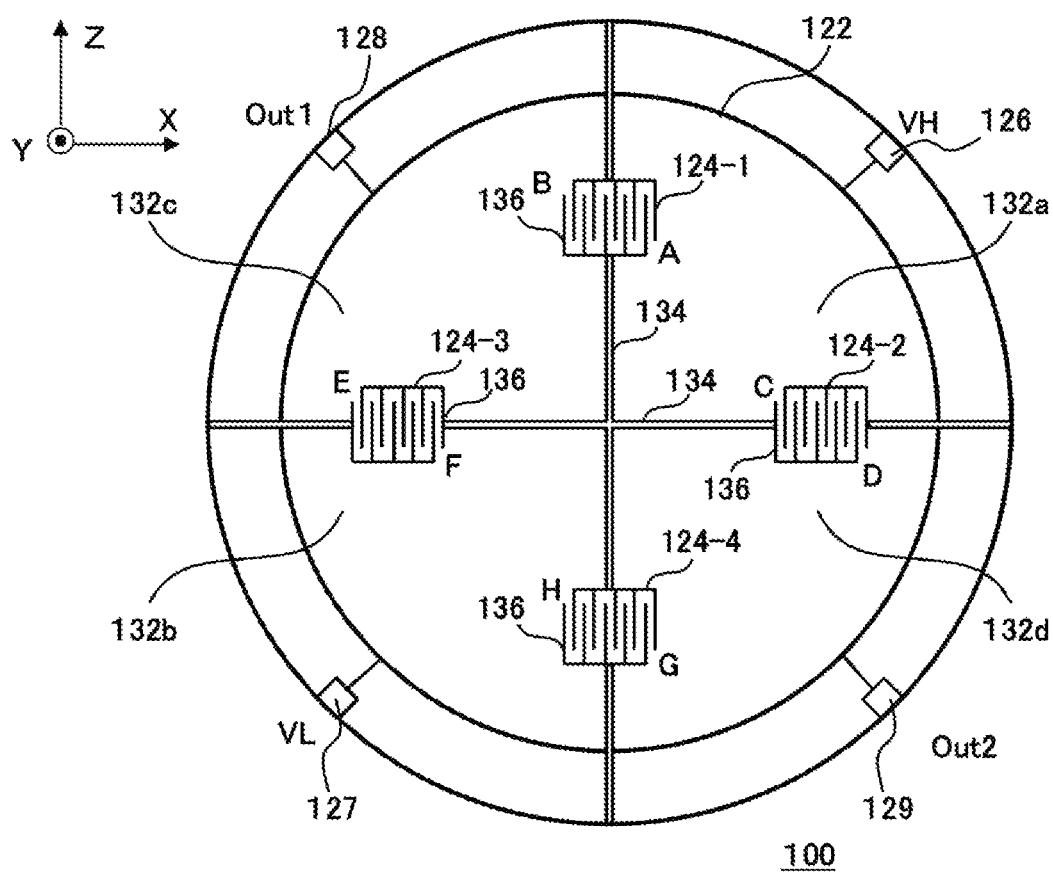
FIG. 3 shows an example of a top view of the pressure sensor 100.

FIG. 3 is an example of a top view of the pressure sensor 100. The semiconductor substrate 120 is, for example, a P-type silicon semiconductor substrate. On the top-surface side of the diaphragm 122, an N-type well region may be formed. A P-type diffusion region 132 is formed in the majority of the N-type well region. The P-type diffusion region 132 is formed as a diffusion region which is shallower than the N-type well region. On the surface of the N-type well region, neighboring P-type diffusion regions 132 are separated into multiple P-type diffusion regions 132a, 132b, 132c, 132d by means of LOCOS oxide films 134. Further, in part of the P-type diffusion region 132, four resistor devices 124-1, 124-2, 124-3, 124-4 are formed. Each resistor device may be a diffusion resistor with limited width, separated by the LOCOS oxide films 136.

The neighboring P-type diffusion regions 132a, 132c are electrically connected via the resistor device 124-1, and the parts other than the resistor device 124-1 are electrically separated from each other by means the LOCOS oxide film 134. The neighboring P-type diffusion regions 132a, 132d are electrically connected via the resistor device 124-2, and the parts other than the resistor device 124-2 are electrically separated by means the LOCOS oxide film 134. The neighboring P-type diffusion regions 132c, 132b are electrically connected via the resistor device 124-3, and the parts other than the resistor device 124-3 are electrically separated by means the LOCOS oxide film 134. The neighboring P-type diffusion regions 132b, 132d are electrically connected via the resistor device 124-4, and the parts other than the resistor device 124-4 are electrically separated by means the LOCOS oxide film 134.

Therefore, in this example, the P-type diffusion regions 132a, 132b, 132c, 132d correspond respectively to the bridging sections 125a, 125b, 125c, 125d shown in FIG. 2. The bridging section 125a is electrically connected to the high-voltage-side terminal 126. The bridging section 125b is electrically connected to the low-voltage-side terminal 127 to which the low-voltage-side voltage VL is applied. The bridging section 125c is electrically connected to the first intermediate potential terminal 128 which works as the first output terminal Out 1. The bridging section 125d is electrically connected to the second intermediate potential terminal 129 which works as the second output terminal Out 2.

The high-voltage-side terminal 126, the low-voltage-side terminal 127, the first intermediate potential terminal 128 and the second intermediate potential terminal 129 may be formed on a circumferential region surrounding the diaphragm 122, not on the diaphragm 122. The bottom-surface side of the semiconductor substrate 120 may be applied to VL, and the N-type well at the top-surface side of the diaphragm of the semiconductor substrate 120 may be applied to VH. However, conductivity type and configuration are not limited to the above-described case.

Figure 4:
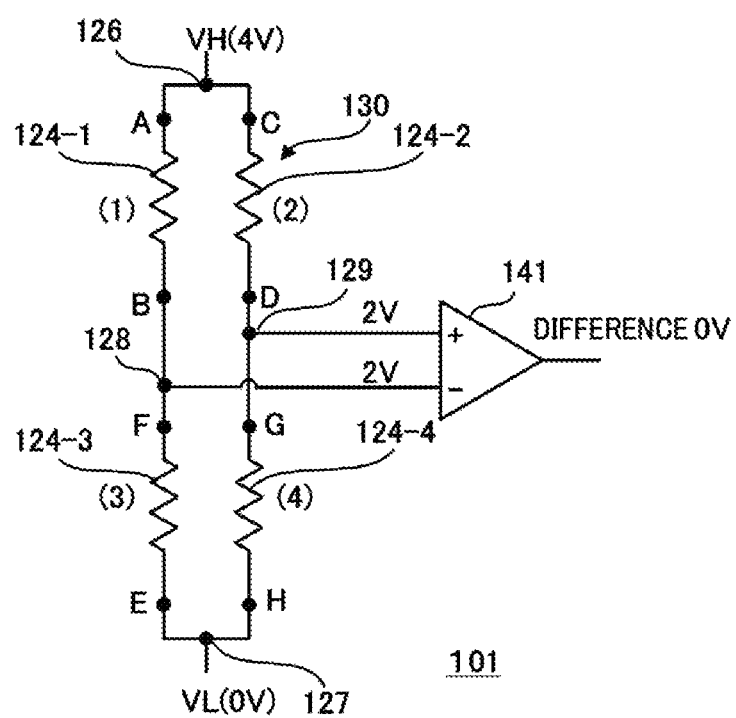
FIG. 4 shows an example of a circuit configuration of a comparative example where there is no break in the diaphragm and no pressure difference between the front and the back of the diaphragm.

FIG. 4 shows an example of a circuit configuration of a comparative example where there is no break in the diaphragm 122 and no pressure difference between the front and the back of the diaphragm 122. As shown in FIG. 4, the pressure sensor 101 in the comparative example comprises a differential amplifier 141. A first input end of the differential amplifier 141 is connected to the first intermediate potential terminal 128, which works as the first output terminal Out 1 of the bridge circuit 130, and a second input end of the differential amplifier 141 is connected to the second intermediate potential terminal 129, which works as the second output terminal Out 2 of the bridge circuit 130.

The resistor devices 124-1 to 124-4 are located as the gauge resistors (piezo resistors) at the diaphragm 122, and these gauge resistors configure the bridge circuit 130. The potential difference between the first intermediate potential terminal 128 and the second intermediate potential terminal 129 of the bridge circuit 130 varies, depending on the magnitude of the pressure. The first intermediate potential terminal 128 is electrically connected to the first input end of the differential amplifier 141, and the second intermediate potential terminal 129 is inputted to the second input end of the differential amplifier 141. The differential amplifier 141 amplifies the potential difference between the first intermediate potential terminal 128 and the second intermediate potential terminal 129, and so-amplified signal is converted into a digital signal.

If there is no break in the diaphragm 122 and no pressure difference between the front and the back of the diaphragm 122, voltage of (VH+VL)/2 is applied to each of the first input end and the second input end of the differential amplifier 141. In this example, VL=0V, so the voltage of the half value of VH is applied to each of the first input end and the second input end. In this example, VH is 4V, so voltage of 2V is applied to each of the first input end and the second input end of the differential amplifier 141. The differential output of the differential amplifier 141 is 0.

It is noted that, if there is no break in the diaphragm 122 and there is a pressure difference between the front and the back of the diaphragm 122, a voltage difference of around several tens of mV (20 mV to 40 mV) will be generated between the first intermediate potential terminal 128 and the second intermediate potential terminal 129. It is noted that, in the bridge circuit 130, the region between the high-voltage-side terminal 126 and the first intermediate potential terminal 128 is the first region (noted as "(1)"), the region between the high-voltage-side terminal 126 and the second intermediate potential terminal 129 is the second region (noted as "(2)"), the region between the first intermediate potential terminal 128 and the low-voltage-side terminal 127 is the third region (noted as "(3)"), and the region between the second intermediate potential terminal 129 and the low-voltage-side terminal 127 is the fourth region (noted as "(4)").

Figure 5:
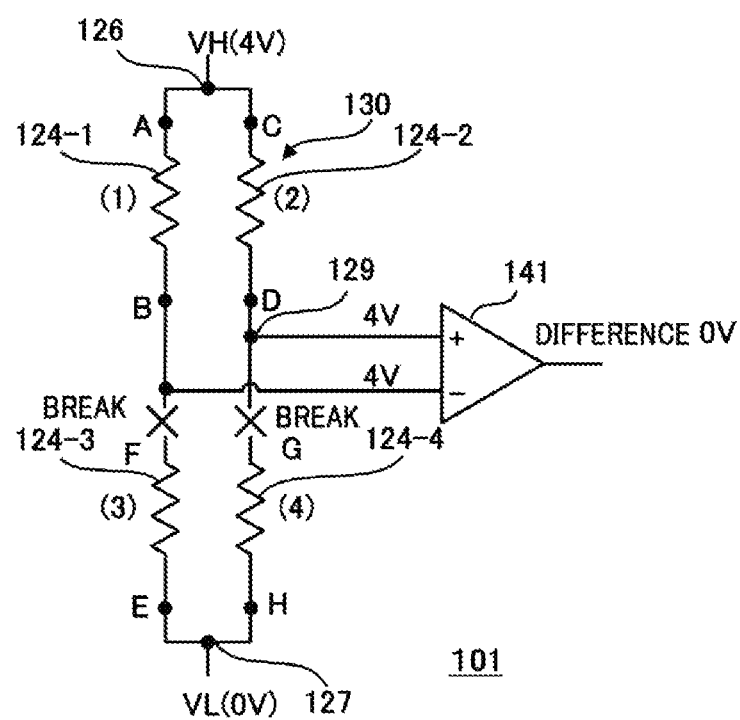
FIG. 5 shows an example of the circuit configuration of the comparative example where each of a third region and a fourth region of the diaphragm is broken.

FIG. 5 shows an example of the circuit configuration of the comparative example where each of the third region ((3)) and the fourth region ((4)) of the diaphragm 122 is broken. As shown in FIG. 5, if the third region ((3)) and the fourth region ((4)) are broken together, voltage of VH is applied to each of the first input end and the second input end of the differential amplifier 141. In this example, voltage of 4V is applied to each of the first input end and the second input end of the differential amplifier 141, and the differential output of the differential amplifier 141 is 0. Accordingly, the differential output of the differential amplifier 141 is the same with the case shown in FIG. 4. It is difficult to detect a failure occurrence solely from the differential output. On the other hand, each of the first output at the first output terminal and the second output at the second output terminal of the bridge circuit 130 is 4V, which is different from the normal case as shown in FIG. 4.

Figure 6:
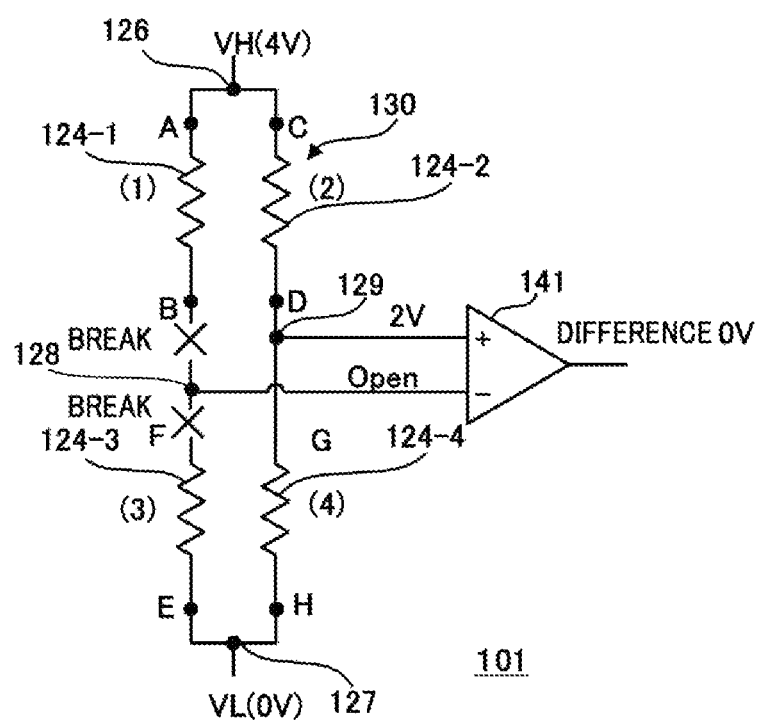
FIG. 6 shows an example of the circuit configuration of the comparative example where each of a first region and the third region of the diaphragm is broken.

FIG. 6 shows an example of the circuit configuration of the comparative example where each of the first region ((1)) and the third region ((3)) of the diaphragm 122 is broken. As shown in FIG. 6, if the first region and the third region are broken together, the first intermediate potential terminal 128, which works as a first output terminal Out 1, will be open (OPEN), and will be in a floating state. The voltage of the second intermediate potential terminal 129 will be 2V. If, occasionally, the voltage of the first intermediate potential terminal 128 in a floating state becomes 2V, voltage of 2V will be applied to each of the first input end and the second input end of the differential amplifier 141. Accordingly, the differential output of the differential amplifier 141 is 0. In this case, too, the differential output of the differential amplifier 141 is the same with the case shown in FIG. 4. It is difficult to detect a failure occurrence solely from the differential output.

Like the pressure sensor 101 in the comparative example as explained above, in some cases it is difficult to detect an abnormality solely by means of a difference (potential difference) between the first output at the first output terminal (first intermediate potential terminal 128) and the second output at the second output terminal (second intermediate potential terminal 129) of the bridge circuit 130 provided at the diaphragm 122. On the other hand, if, not only the potential difference, but also each of the first output of the first intermediate potential terminal 128 and the second output of the second intermediate potential terminal 129 is to be detected, in some cases the pressure sensor 101 can determine whether it is normal or abnormal. For example, in the case of FIG. 5, too, each of the first output at the first output terminal and the second output at the second output terminal is 4V, which is different from the normal case as shown in FIG. 4.

Figure 7:
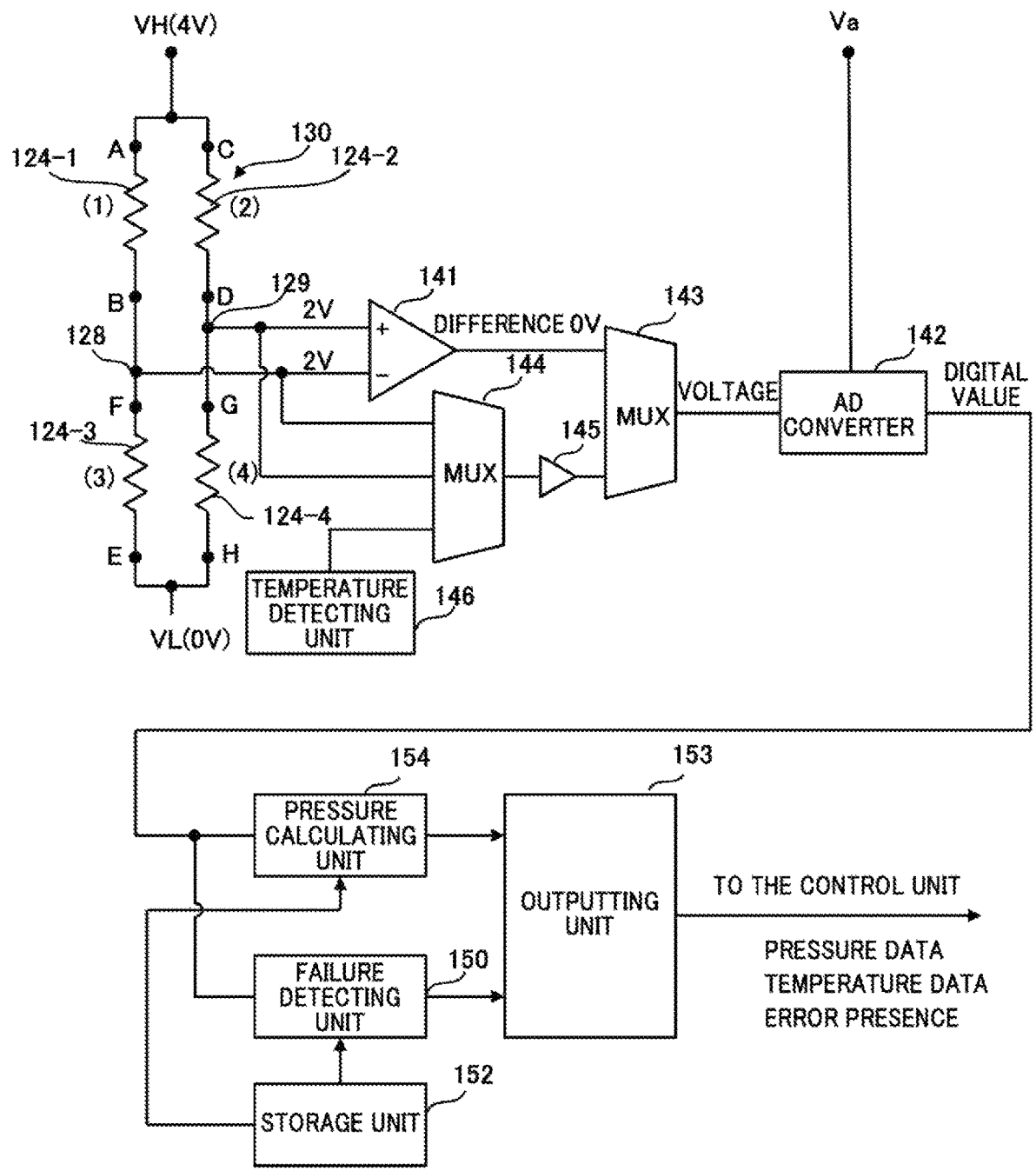
FIG. 7 shows an example of the circuit configuration of the pressure sensor 100 in the embodiment of the present invention.

FIG. 7 shows an example of the circuit configuration of the pressure sensor 100 in the embodiment of the present invention. The pressure sensor 100 comprises the bridge circuit 130, the AD converter 142 and the failure detecting unit 150. The AD converter 142 is an example of the detecting unit for detecting each of the first output at the first output terminal (first intermediate potential terminal 128) and the second output of the second output terminal (second intermediate potential terminal 129) of the bridge circuit 130. The failure detecting unit 150 detects failure of the bridge circuit 130, based on the detection result at the detecting unit. In this example, the failure detecting unit 150 detects failure of the bridge circuit 130, based on the output result of the AD converter 142.

The pressure sensor 100 of this example comprises a differential amplifier 141, a first multiplexer 143, a second multiplexer 144 and a buffer 145. The first multiplexer 143 and the second multiplexer 144 may be switching circuits. The first multiplexer 143 receives not only amplifier output by the differential amplifier 141 but also inputs from the first output of the first intermediate potential terminal 128 and the second output of the second intermediate potential terminal 129. The amplifier output of the differential amplifier 141 is the signal obtained by amplifying the difference between the first output of the first intermediate potential terminal 128 and the second output of the second intermediate output terminal 129.

The pressure sensor 100 as shown in FIG. 7 may comprise a temperature detecting unit 146. Resistance values of the resistor devices 124-1, 124-2, 124-3, 124-4 depend on the temperature. Thus, to measure the pressure precisely in order to correct the variation of the resistance values due to the temperature, the temperature detecting unit 146 outputs a temperature signal depending on the detected temperature. A temperature signal is inputted to the second multiplexer 144 by means of the temperature detecting unit 146. Then, the first output at the first output terminal (first intermediate potential terminal 128) and the second output of the second output terminal (second intermediate potential terminal 129) of the bridge circuit 130 may be inputted to the second multiplexer 144.

The output end of the second multiplexer 144 may be connected to the buffer 145. The second multiplexer 144 works as the selecting unit for selecting in a time-sharing manner and inputting to the buffer 145 the first output, the second output and the temperature signal. The buffer 145 inputs the signal inputs to the AD converter 142. In this example, the output of the buffer 145 may be inputted to the AD converter 142 via the first multiplexer 143. The buffer 145 may be a driver for giving a driving force. However, the first output of the first intermediate potential terminal 128 and the second output of the second intermediate potential terminal 129 may be inputted to the AD converter 142 as they are, without going through the buffer 145.

In this example, the first multiplexer 143 and the second multiplexer 144 switch the signal ultimately inputted to the AD converter 142. The first multiplexer 143 and the second multiplexer 144 may receive a timing signal from the failure detecting unit 150 to switch the inputted signal to the AD converter 142.

Thus, the AD converter 142 AD-converts in a time-sharing manner the first output of the first intermediate potential terminal 128 and the second output of the second intermediate potential terminal 129. For reference, the AD converter 142 may always operate in a time-sharing manner. On the other hand, in a timing of a system start of an automotive engine using the pressure sensor 100, the first output and the second output may be operated in a time-sharing manner. Also, certain diagnosis period may be set in order that a failure diagnosis processing is performed based on the first output and the second output, per each diagnosis period.

In this example, since the first multiplexer 143 and the second multiplexer 144 switch the inputted signal to the AD converter 142, the AD converter 142 may AD-convert in a time-sharing manner the first output, the second output, the difference between the first output and the second output, and the temperature signal. Especially, the difference between the first output and the second output may be the signal obtained by amplifying the difference by the differential amplifier 141. Signals AD-converted in a time-sharing manner by the AD converter 142 is not limited to this case. Other signals may further be included as the signals to be AD-converted in a time-sharing manner, and part of the signals may be omitted. In an example, the AD converter 142 may AD-convert in a time-sharing manner the first output, the second output, and the difference between the first output and the second output.

The pressure sensor 100 may comprise the failure detecting unit 150, a storage unit 152, an outputting unit 153 and a pressure calculating unit 154. Output signals from the AD converter 142 are received by the failure detecting unit 150 and the pressure calculating unit 154. The pressure calculating unit 154 calculates pressure based on digital values of the difference between the first output and the second output. Concretely saying, amplifier outputs obtained by amplifying the difference between the first output and the second output by the differential amplifier 141 are AD-converted to digital values. The pressure calculating unit 154 may calculate pressure based on the digital values. At this time, the pressure calculating unit 154 may correct the temperature of the pressure data, based on the digitalized temperature data. Calculated pressure data and temperature data may be outputted by the outputting unit 153.

The failure detecting unit 150 may detect failure of the bridge circuit 130, based on the detection result at the AD converter 142 which works as the detecting unit. The failure detecting unit 150 may supply signals for switching output signals from the first multiplexer 143 and the second multiplexer 144 to the first multiplexer 143 and the second multiplexer 144.

When at least one of the first output of the first intermediate potential terminal 128 and the second output of the second intermediate potential terminal 129 is out of the predetermined range, which includes the intermediate voltage ((VH+VL)/2) between the high-voltage-side voltage (VH) and the low-voltage-side voltage (VL), the failure detecting unit 150 determines that the bridge circuit 130 is in failure. In an example, the predetermined range may be the intermediate voltage ((VH+VL)/2)±α. α may be set to a value greater than the variation range due to pressure (mV range). If (VH+VL)/2 is 2V, α may be 0.1V or greater, or may be 0.5V or smaller.

When a is 0.1V, the predetermined range may be: the lower limit value may be 2V−0.1V=1.9V, and the upper limit value may be 2V+0.1V=2.1V. The upper limit value and the lower limit value may be pre-stored in a storage area of the storage unit 152. Provided that, the upper limit value and the lower limit value to be set are not limited to these cases, rather, they may be set appropriately so that they may not be subjected to noise or the like.

The failure detecting unit 150 may include a comparator circuit for comparing digital values of the first output and the second output, which have been AD-converted by the AD converter 142, to their respective upper limit values and lower limit values. The failure detecting unit 150 may determine that the bridge circuit 130 is in failure, assuming that the failure determination condition is met, when at least one of the digital values of the first output and the second output is not included in the range from the upper to lower limits. The outputting unit 153 may output signal indicating occurrence of an error to an external control unit. The external control unit is, for example, an ECU (engine control unit) in an automobile.

As explained above along with FIG. 4, when the bridge circuit 130 is in a normal state, the first output of the first intermediate potential terminal 128 and the second output of the second intermediate potential terminal 129 are, together, within the range of ((VH+VL)/2)±α. On the other hand, as explained using FIG. 5, when the third region ((3)) and the fourth region ((4)) are broken together, voltage of VH (4V) is applied to each of the first input end and the second input end of the differential amplifier 141. Accordingly, at least one of the first output of the first intermediate potential terminal 128 and the second output of the second intermediate potential terminal 129 is out of the predetermined range, which includes the intermediate voltage ((VH+VL)/2) between the high-voltage-side voltage (VH) and the low-voltage-side voltage (VL). The failure detecting unit 150 may determine that the bridge circuit 130 is in failure.

On the other hand, as explained above along with FIG. 6, when at least one of the first intermediate potential terminal 128 and the second intermediate potential terminal 129 becomes Open (floating) due to a break of the diaphragm 122, the output voltage of the terminal that has become Open (floating) will be inconstant. There may be cases where the voltage of this terminal occasionally be within the above-mentioned predetermined range, for example, the intermediate voltage ((VH+VL)/2)±α. To detect failure in case where at least one of the first intermediate potential terminal 128 and the second intermediate potential terminal 129 becomes Open (floating), a pressure sensor 100 having a voltage control unit may be adopted.

Figure 8:
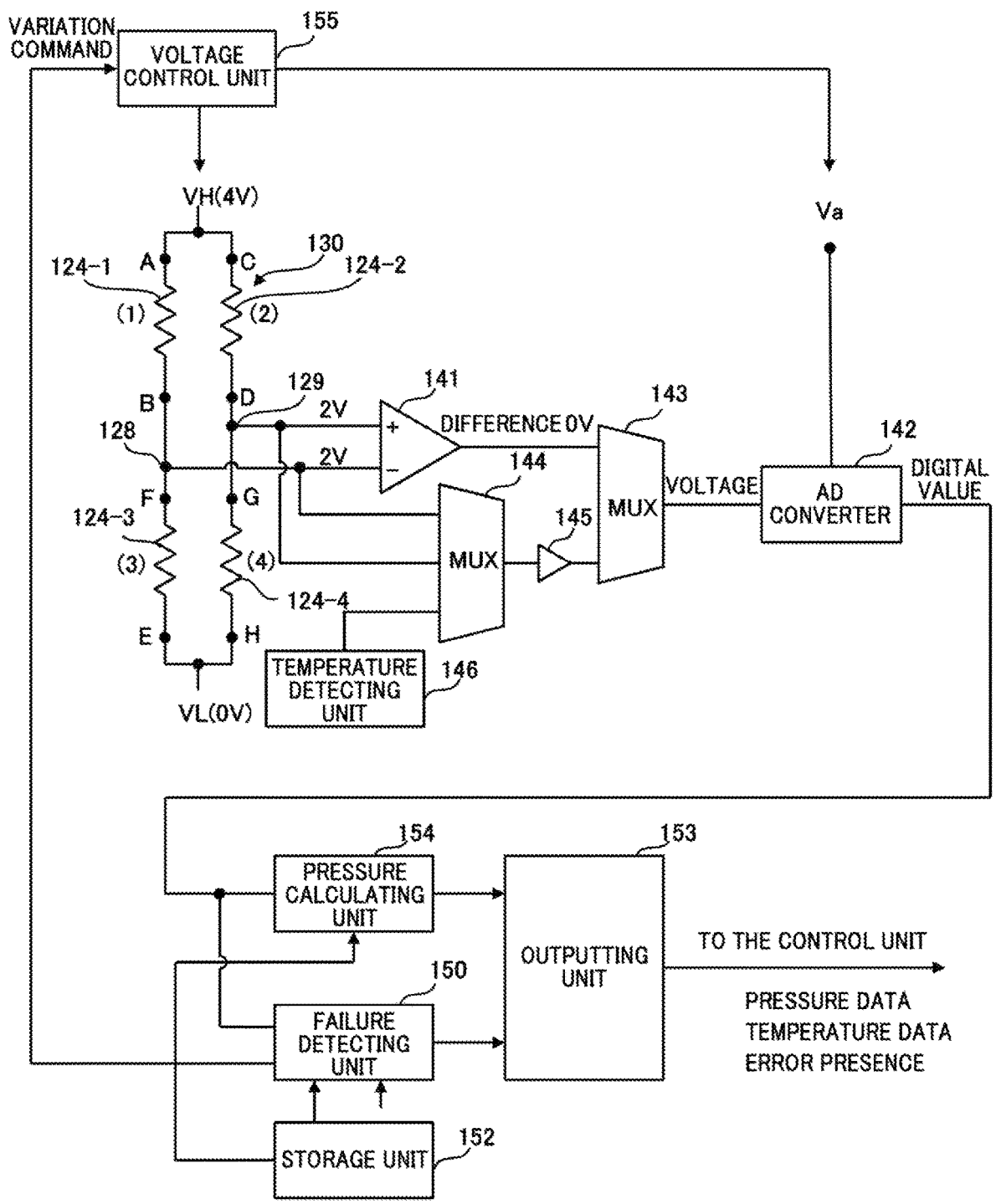
FIG. 8 shows an example of the circuit configuration of the pressure sensor 100 including a voltage control unit.

FIG. 8 show an example of the circuit configuration of the pressure sensor 100 having a voltage control unit. The pressure sensor 100 comprises the voltage control unit 155. The failure detecting unit 150 sends a voltage variation command to the voltage control unit 155. The voltage control unit 155, which has received the variation command, will vary at least one of the high-voltage-side voltage VH and the low-voltage-side voltage VL, in order that the intermediate voltage between the high-voltage-side voltage and the low-voltage-side voltage, namely (VH+VL)/2, will vary. For example, the high-voltage-side voltage VH is varied to 4V, 3V, or 2V. At least one of the high-voltage-side voltage VH and the low-voltage-side voltage VL may be varied sequentially at a time-shared timing.

The failure detecting unit 150 detects a failure of the bridge circuit 130, based on the variation of at least one of the first output and the second output when the intermediate voltage is varied. Concretely saying, the failure detecting unit 150 may determine that the bridge circuit 130 is in failure, if voltage variation of the first output of the first intermediate potential terminal 128 or voltage variation of the second output of the second intermediate potential terminal 129 when the intermediate voltage is varied is within the predetermined range. Said range is smaller than the variation amplitude of the intermediate voltage.

Figure 9:
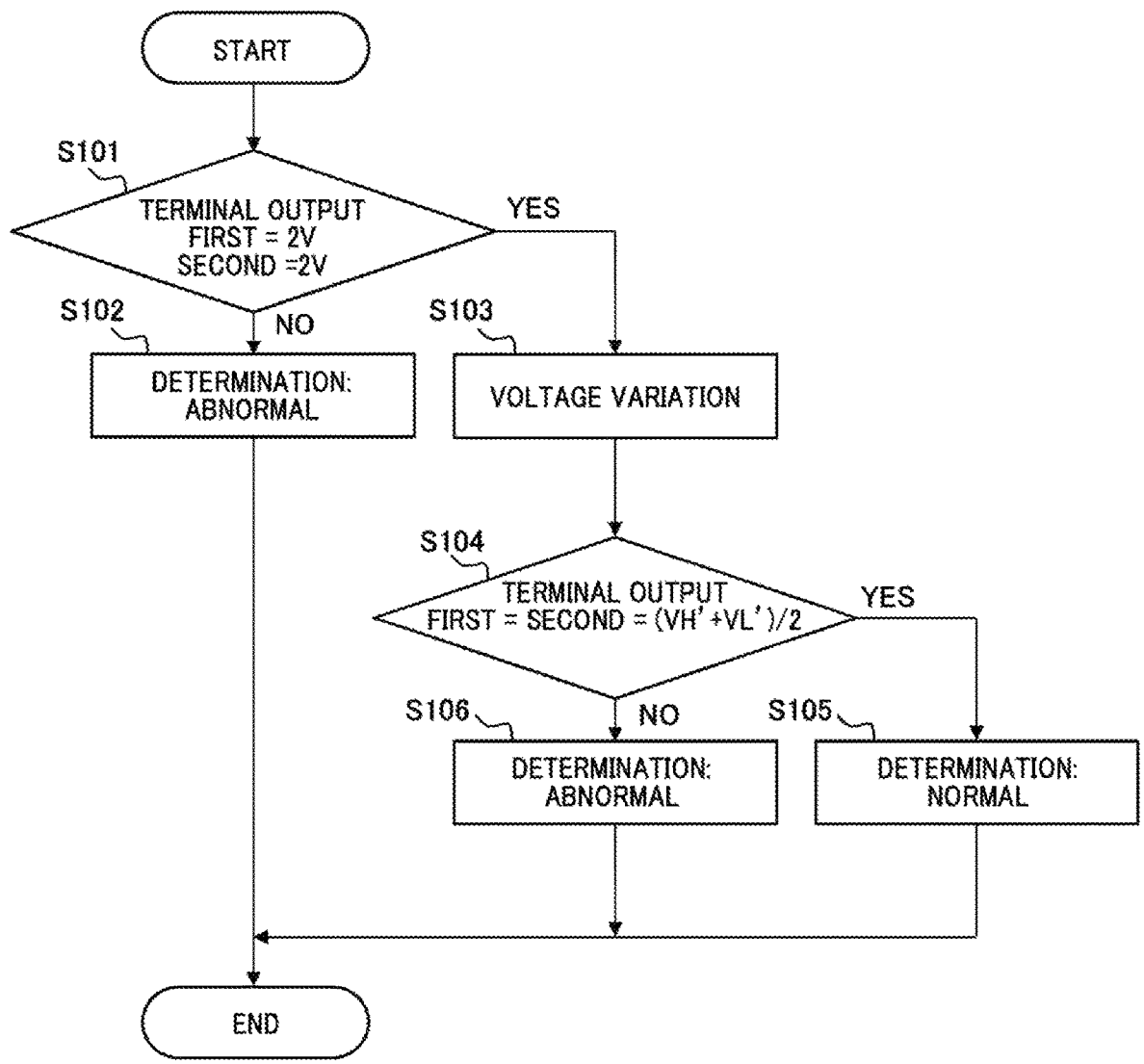
FIG. 9 is a flowchart showing an example of failure detection processing by means of the pressure sensor 100.

FIG. 9 is a flowchart showing an example of failure detection processing by the pressure sensor 100. The failure detecting unit 150 detects a failure of the bridge circuit 130, based on the output result at the AD converter 142. When at least one of the first output and the second output is out of the predetermined range, which includes the intermediate voltage (VH+VL)/2 between the high-voltage-side voltage VH and the low-voltage-side voltage VL (Step S101: NO), the failure detecting unit 150 determines that the bridge circuit 130 is in failure (Step S102).

For example, if VH=4V and VL=0V, and further at least one of the first output and the second output is out of the range of the intermediate voltage of 2V±α (Step S101: NO), the failure detecting unit 150 determines that the bridge circuit 130 is in failure (Step S102). Thus, if the first output or the second output is out of the predetermined range, failure can be determined without waiting the result of voltage variation processing or the like.

On the other hand, when the first output or the second output is within the predetermined range (Step S101: YES), the failure detecting unit 150 sends a voltage variation command to the voltage control unit 155 (Step S103). The voltage control unit 155, which has received the variation command, will vary at least one of the high-voltage-side voltage VH and the low-voltage-side voltage VL, in order that the intermediate voltage between the high-voltage-side voltage and the low-voltage-side voltage, namely (VH+VL)/2, will vary. For example, the high-voltage-side voltage VH is changed to multiple steps, such as 4V, 3V, 2V (Step S103).

When the voltage control unit 155 varies the high-voltage-side voltage VH to high-voltage-side voltage VH' and the low-voltage-side voltage VL to low-voltage-side voltage VL', and if the bridge circuit 130 is in normal state, the intermediate voltage (VH+VL)/2 between the high-voltage-side voltage and the low-voltage-side voltage varies to (VH'+VL')/2. And the first output and the second output vary from (VH+VL)/2 to (VH'+VL')/2. On the other hand, when at least one of the first intermediate potential terminal 128 and the second intermediate potential terminal 129 is Open (floating), even though the intermediate voltage (VH+VL)/2 between the high-voltage-side voltage and the low-voltage-side voltage varies to (VH'+VL')/2, variation of the first output and variation of the second output do not vary to (VH'+VL')/2.

Thus, when the first output and the second output vary depending on the variation range from (VH+VL)/2 to (VH'+VL')/2 (Step S104: YES), the failure detecting unit 150 determines that the bridge circuit 130 is not in failure, i.e. in normal state (Step S105). On the other hand, if variation of the first output and the second output does not vary depending on the variation range from (VH+VL)/2 to (VH'+VL')/2 (Step S104: NO), and is within the predetermined range, the failure detecting unit 150 determines that the bridge circuit 130 is in failure, i.e. in abnormal state (Step S106).

As explained above, even when the first output or the second output is out of the predetermined lower and upper limit range, and also even when it is within the predetermined lower and upper limit range, but if variation of at least one of the first output and the second output when the intermediate voltage has been varied is smaller compared to the predetermined value, the failure detecting unit 150 may determine that the bridge circuit 130 is in failure.

In FIG. 9, by varying at least one of the high-voltage-side voltage VH and the low-voltage-side voltage VL, output from the bridge circuit 130 varies. For example, when the high-voltage-side voltage VH=4V and the low-voltage-side voltage VL=0V, the first output of the first intermediate potential terminal 128 and the second output of the second intermediate potential terminal 129 indicate values of around 2V. When the high-voltage-side voltage VH is varied to 3V, the first output and the second output indicate values of around 1.5V. Thus, at the AD converter 142, despite the digital values of the first output and the second output were 2V (2048 in a binary number) when the high-voltage-side voltage VH=4V (4095 in a binary number), if the high-voltage-side voltage VH is varied to 3V, the digital values of the first output and the second output vary to 1365. To prevent this, the voltage control unit 155 may also make the high-voltage-side supply voltage (driving voltage) Va of the AD converter 142 vary to adjust the dynamic range of the AD converter 142.

Figure 10:
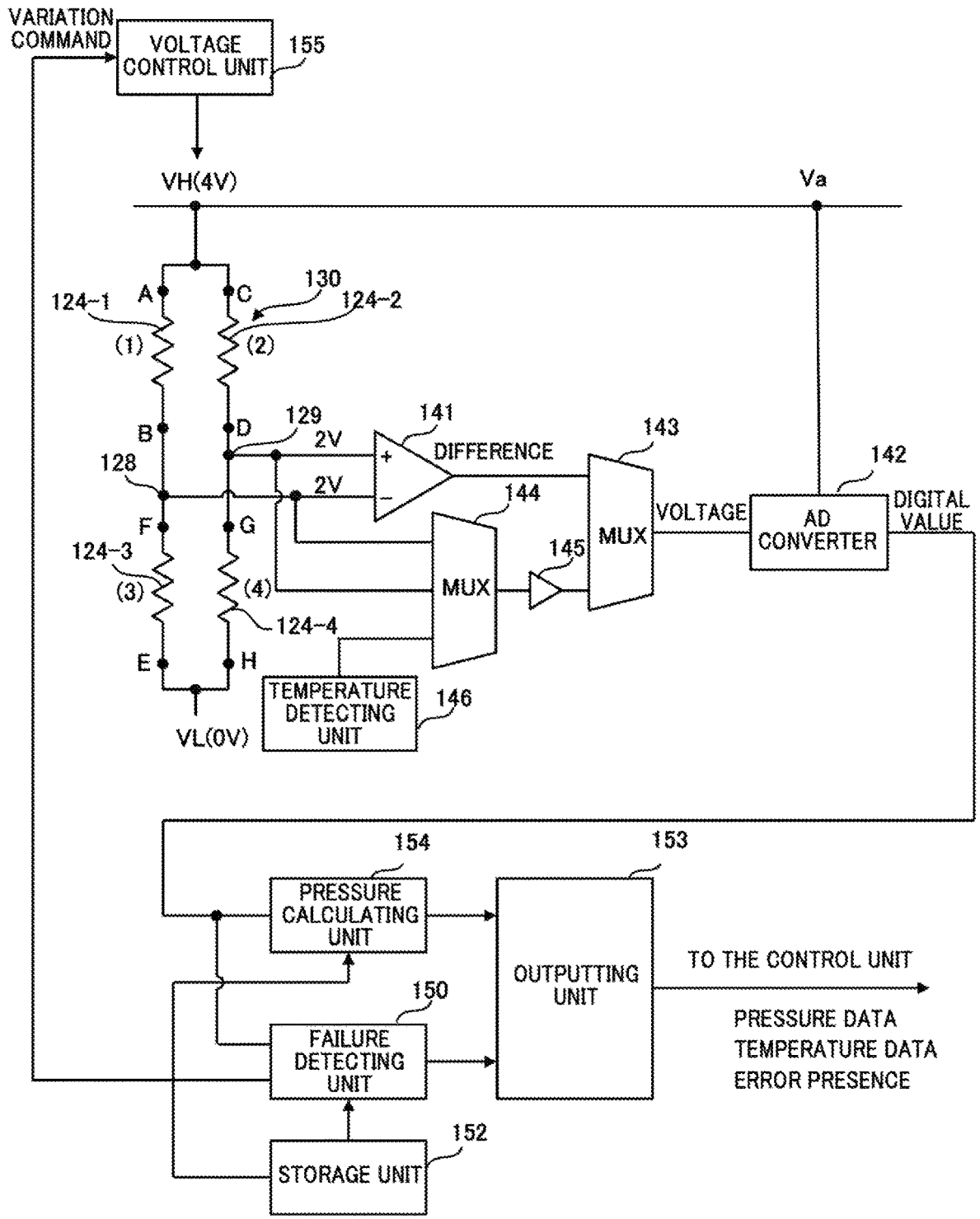
FIG. 10 shows another example of the circuit configuration of the pressure sensor 100 including a voltage control unit.

FIG. 10 shows another example of the circuit configuration of the pressure sensor 100 including a voltage control unit. As shown in FIG. 10, the high-voltage-side voltage VH of the bridge circuit 130 may be inputted as the high-voltage-side supply voltage Va to the AD converter 142. In this case, there will be no need that the voltage control unit 155 separately adjusts the high-voltage-side supply voltage (driving voltage) Va of the AD converter 142.

FIG. 11 shows an example of failure detection by the pressure sensor 100 of the embodiment of the present invention. The column "Line break" shows the region(s) where a line break occurred, among the first region ((1)), the second region ((2)), the third region ((3)) and the fourth region ((4)). The column "First output terminal" shows the voltage value of the first output of the first intermediate potential terminal 128, and the column "Second output terminal" shows the voltage value of the second output of the second intermediate potential terminal 129. This example shows a state where the high-voltage-side voltage VH=4V and the low-voltage-side voltage VL=0V.

For example, as shown in the first case, if the bridge circuit 130 is in a normal state, voltage of the first output is 2V and voltage of the second output is 2V. Since at least one of the first output and the second output is not out of the predetermined range, which includes the intermediate voltage between the high-voltage-side voltage and the low-voltage-side voltage, the failure detecting unit 150 does not detect failure.

The pressure sensor 100 has the AD converter 142 for detecting each of the first output of the first intermediate potential terminal 128 and the second output of the second intermediate potential terminal 129. And the failure detecting unit 150 detects failure of the bridge circuit 130, based on the detection result at the AD converter 142. Accordingly, like the eleventh case in FIG. 11, failure of the bridge circuit 130 can be precisely determined even in cases where failure determination is difficult solely from the difference between the first output and the second output. For reference, as shown in FIG. 11, line break parts of the bridge circuit 130 may be identified, based on the values of the first output and the second output.

In the seventh, tenth and sixteenth cases in FIG. 11, voltage of the terminal which is Open (floating) is inconstant. If the voltage of this terminal occasionally becomes 2V, it becomes the same with the first case (normal), then determination of failure is difficult. However, the pressure sensor 100 can measure the output variation in cases where any one of the voltages applied to the high-voltage-side terminals 126 and the low-voltage-side terminals 127 of the bridge circuit 130 to perform determination of failure.

As explained above, according to the pressure sensor 100 depicted using FIGS. 1 to 11, the failure mode of the bridge circuit 130, which has been difficult to determine solely from the difference between the first output at the first intermediate potential terminal 128 and the second output of the second intermediate potential terminal 129 of the bridge circuit 130, can be detected. Even when the diaphragm 122 is damaged, it is possible to immediately determined a failure.

While the embodiments of the present invention have been described, the technical scope of the invention is not limited to the above described embodiments.

It is apparent to persons skilled in the art that various alterations and improvements can be added to the above-described embodiments.

It is also apparent from the scope of the claims that the embodiments added with such alterations or improvements can be included in the technical scope of the invention.

EXPLANATION OF REFERENCES

10 First chamber; 11 First pressure medium; 20 Second chamber; 21 Second pressure medium; 30 Protection material; 100 Pressure sensor; 101 Pressure sensor; 110 Base material; 120 Semiconductor substrate; 121 Concave portion; 122 Diaphragm; 124 Resistor device; 125 Bridging section; 126 High-voltage-side terminal; 127 Low-voltage-side terminal; 128 First intermediate potential terminal; 129 Second intermediate potential terminal; 130 Bridge circuit; 132 P-type diffusion region; 134 LOCOS oxide film; 136 LOCOS oxide film; 141 Differential amplifier; 142 AD converter; 143 First multiplexer; 144 Second multiplexer; 145 Buffer; 146 Temperature detecting unit; 150 Failure detecting unit; 152 Storage unit; 153 Outputting unit; 154 Pressure calculating unit; 155 Voltage control unit

What is claimed is:

1. A pressure sensor, comprising:
a substrate provided with a diaphragm;
a bridge circuit having four resistor devices provided at the diaphragm, the bridge circuit being applied with high-voltage-side voltage and low-voltage-side voltage, and having two output terminals;
a detecting unit for detecting a first output at a first output terminal and a second output at a second output terminal, each output terminal being of the bridge circuit; and
a failure detecting unit for detecting failure of the bridge circuit based on a detection result by the detecting unit, wherein
the failure detecting unit determines that the bridge circuit is in failure when at least one of the first output and the second output is out of a predetermined range, which includes an intermediate voltage between the high-voltage-side voltage and the low-voltage-side voltage,
the failure detecting unit further comprises a voltage control unit for varying at least one of the high-voltage-side voltage and the low-voltage-side voltage so that the intermediate voltage between the high-voltage-side voltage and the low-voltage-side voltage varies when the first output and the second output are within a predetermined range, which includes the intermediate voltage between the high-voltage-side voltage and the low-voltage-side voltage, and
wherein the failure detecting unit detects the failure of the bridge circuit when variation of the at least one of the first output and the second output when the intermediate voltage is varied, is smaller compared to a predetermined value.

2. The pressure sensor according to claim 1, wherein
the detecting unit includes an AD converter, and
the AD converter AD-converts the first output and the second output in a time-sharing manner.

3. The pressure sensor according to claim 2,
wherein the high-voltage-side voltage of the bridge circuit is inputted as a high-voltage-side supply voltage to the AD converter.

4. A pressure sensor, comprising:
a substrate provided with a diaphragm;
a bridge circuit having four resistor devices provided at the diaphragm, the bridge circuit being applied with high-voltage-side voltage and low-voltage-side voltage, and having two output terminals;
a detecting unit for detecting a first output at a first output terminal and a second output at a second output terminal, each output terminal being of the bridge circuit;
a failure detecting unit for detecting failure of the bridge circuit based on a detection result by the detecting unit; and
a voltage control unit for varying at least one of the high-voltage-side voltage and the low-voltage-side voltage so that an intermediate voltage between the high-voltage-side voltage and the low-voltage-side voltage varies,
wherein the failure detecting unit detects the failure of the bridge circuit, based on variation of at least one of the first output and the second output when the intermediate voltage is varied.

5. The pressure sensor according to claim 4,
wherein the voltage control unit varies the at least one of the high-voltage-side voltage and the low-voltage-side voltage to 3 or more voltage values so that the intermediate voltage between the high-voltage-side voltage and the low-voltage-side voltage varies.

6. The pressure sensor according to claim 4, wherein
the detecting unit includes an AD converter,
the AD converter AD-converts the first output and the second output in a time-sharing manner; and
the voltage control unit adjusts high-voltage-side supply voltage of the AD converter in accordance with variation of the at least one of the high-voltage-side voltage and the low-voltage-side voltage.

7. A pressure sensor, comprising:
a substrate provided with a diaphragm;
a bridge circuit having four resistor devices provided at the diaphragm, the bridge circuit being applied with high-voltage-side voltage and low-voltage-side voltage, and having two output terminals;
a detecting unit for detecting a first output at a first output terminal and a second output at a second output terminal, each output terminal being of the bridge circuit; and
a failure detecting unit for detecting failure of the bridge circuit based on a detection result by the detecting unit, wherein
the detecting unit includes an AD converter;
the AD converter AD-converts the first output and the second output in a time-sharing manner,
the AD converter AD-converts the first output, the second output, and a difference between the first output and the second output in a time-sharing manner, and
the pressure sensor further comprises a pressure calculating unit for calculating pressure, based on a digital value of the difference between the first output and the second output.

8. The pressure sensor according to claim 7, further comprising:
a temperature detecting unit for outputting a temperature signal depending on detected temperature,
wherein the AD converter AD-converts the first output, the second output, the difference between the first output and the second output, and the temperature signal in a time-sharing manner.

9. The pressure sensor according to claim 8, comprising:
a buffer for inputting inputted signal to the AD converter; and
a selecting unit for selecting in a time-sharing manner and inputting to the buffer the first output, the second output, and the temperature signal.

10. The pressure sensor according to claim 7,
wherein the high-voltage-side voltage of the bridge circuit is inputted as a high-voltage-side supply voltage to the AD converter.

* * * * *